(12) United States Patent
Mishima et al.

(10) Patent No.: US 7,378,613 B2
(45) Date of Patent: May 27, 2008

(54) ARC WELDING ROBOT

(75) Inventors: Toshiyuki Mishima, Neyagawa (JP); Yaushi Mukai, Osaka (JP); Wataru Takahashi, Osaka (JP); Takashi Nagai, Osaka (JP); Takayasu Ohara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/567,977

(22) PCT Filed: Jun. 9, 2005

(86) PCT No.: PCT/JP2005/010593

§ 371 (c)(1),
(2), (4) Date: Feb. 10, 2006

(87) PCT Pub. No.: WO2006/001177

PCT Pub. Date: Jan. 5, 2006

(65) Prior Publication Data

US 2007/0017911 A1 Jan. 25, 2007

(30) Foreign Application Priority Data

Jun. 24, 2004 (JP) ............... 2004-186084

(51) Int. Cl.
*B23K 9/12* (2006.01)

(52) U.S. Cl. ............... 219/125.1; 219/137.9; 901/42

(58) Field of Classification Search ............. 219/125.1, 219/137.9; 901/42
See application file for complete search history.

(56) References Cited

FOREIGN PATENT DOCUMENTS

| JP | 8-57648 |   | 3/1996 |
|----|---------|---|--------|
| JP | 8-155881 | * | 6/1996 |
| JP | 8-155881 A | * | 6/1996 |

* cited by examiner

*Primary Examiner*—Kevin P Kerns
(74) *Attorney, Agent, or Firm*—Pearne & Gordon LLP

(57) ABSTRACT

A robot main body is provided with a protection cover. The robot main body can be swung by a rotary pipe shaft holding a wire feed device and including a hollow portion and is structured such that a connecting cable and/or a gas hose are guided through the hollow portion of the rotary pipe shaft and are then guided through the forearm portion and base portion thereof. The protection cover covers the portions of the connecting cable and/or gas hose ranging from the connecting portion of the wire feed device and connecting cable and/or gas hose to the rotary pipe shaft.

5 Claims, 5 Drawing Sheets

PRIOR ART

ARC WELDING ROBOT

TECHNICAL FIELD

The present invention relates to an arc welding robot.

BACKGROUND ART

In a welding operation line represented by automobile production, there is often used an arc welding robot of a 6-shaft joint type and, in recent years, there has been demanded high speed and high quality welding in order to enhance productivity.

To realize the high speed and high quality arc welding, it is necessary to feed a welding wire stably and, conventionally, there is employed a mounting member for mounting a wire feed device onto a robot main body in such a manner that the wire feed device can be shifted in a direction to reduce the curvature of a conduit cable for guiding the welding wire, thereby reducing the feed resistance of the welding wire (see the patent literature 1, for example).

Here, FIG. 5 is an external view of the above-mentioned conventional arc welding robot. A robot main body 101 includes a base portion 101a to be installed in a production line (not shown), a swing portion 101b mounted on the upper portion of the base portion 101a and swingable in the horizontal direction, an upper arm portion 101c mounted on the swing portion 101b and swingable back and forth, a forearm portion 101d mounted on the upper arm portion 101c and swingable in the vertical direction, and a wrist portion 101e mounted on the forearm portion 101d and having three-degree freedom. The positioning of a welding torch 102 mounted on the wrist portion 101e is executed through the cooperative operations of the base portion 101a, swing portion 101b, upper arm portion 101c and forearm portion 101d, and the direction of the welding torch 102 is decided through the operation of the wrist portion 101e, thereby allowing the arc welding robot to perform an arc welding operation in a free attitude. Reference character 105 designates a wire feed device which is mounted on a mounting member 106 and supplies a welding wire 103 to the welding torch 102 from a wire supply source 104 installed in the production line. And, 107 stands for a conduit cable which is composed of a conduit cable front portion 107a for connecting together the wire feed device 105 and welding torch 102 and a conduit cable rear portion 107b for connecting together the wire feed device 105 and wire supply source 104. The welding wire 103 is fed through the inside of the conduit cable 107 to a welding portion (not shown) by the wire feed device 105. On the wire feed device 105, there are mounted a connecting cable and/or a gas hose 109 which are respectively used to provide a welding power supply, send a signal for opening and closing welding assist gas, provide a wire feed device power supply, and supply the welding assist gas; and, the connecting cable and/or hose 109 are connected direct to a welding power supply (not shown), a gas supply source (not shown), an external control unit (not shown) and the like. Also, 301 designates a rotary shaft which is mounted between the mounting member 106 and forearm portion 101d and can be rotated back and forth so that the wire feed device 105 can be swung back and forth.

Now, description will be given here of the operation of the above-structured arc welding robot. When, owing to variations in the attitudes of the respective portions of the robot main body 101, the welding torch 102 is shifted backward and thus approaches the wire feed device, there is applied to the curved conduit cable front portion 107a a force which transforms the portion 107a in such a manner that the curvature thereof is increased; but, because of its restoring force (reacting force) to reduce the curvature thereof, the conduit cable front portion 107a swings the wire feed device 105 backward, thereby being able to keep its small curvature. Since the welding wire 103 is moved through the inside of the-thus structured conduit cable 107, the transformation of the welding wire 103 can be prevented and thus the welding wire 103 can be fed stably.

Patent literature 1: JP-A-8-57648 publication (FIG. 1)

DISCLOSURE OF THE INVENTION

Problems to be Solved by the Invention

However, in the above-mentioned conventional arc welding robot, since the connecting cable and/or gas hose are swung around due to the attitude of the robot main body and the swing motion of the wire feed device, there is a fear that the connecting cable and/or hose can interfere with external equipment and can be thereby damaged. Also, there is found a disadvantage that the robot main body requires an extra installation space for securing a sufficient distance between the external equipment and itself so as to avoid the interference.

It is an object of the invention to provide an arc welding robot which not only can realize the stable feed of the welding wire but also can prevent the connecting cable and/or hose from interfering with external equipment.

Means for Solving the Problems

To solve the above problems found in the above-cited conventional arc welding robot, according to the invention, there is provided an arc welding robot, comprising: a robot main body structured such that the operation thereof can be controlled; a wire feed device for feeding a welding wire; a rotary pipe shaft for holding the wire feed device on the robot main body in such a manner that the wire feed device can be rotated on the rotation surface thereof extending substantially in the same direction as the feeding direction of the welding wire; and, a connecting cable and/or a gas hose necessary to execute welding, wherein the connecting cable and/or gas hose are guided through the hollow portion of the rotary pipe shaft and are then guided through the base portion of the robot main body.

In an arc welding robot according to the invention, the wire feed device is rotatably held on the forearm portion of the robot main body through the rotary pipe shaft.

Also, in an arc welding robot according to the invention, the connecting cable and/or gas hose include at least one of a cable for welding power supply, a cable for an opening and closing signal for welding assist gas, a cable for wire feed device power supply, and a gas hose for supply of the welding assist gas.

Further, an arc welding robot according to the invention further includes a protection cover for covering not only the wire feed device but also the portions of the cable and/or gas hose ranging from the wire feed device to the rotary pipe shaft.

EFFECTS OF THE INVENTION

As described above, according to the invention, the curvature of the conduit cable can be kept small to thereby be able to realize the stable feed of the welding wire and, at the same time, the swing-around movements of the connecting cable/or gas hose can be avoided to thereby be able to prevent them against interference with the external equipment and thus prevent the damage thereof due to such interference.

DESCRIPTION OF REFERENCE CHARACTERS

Figure 1:
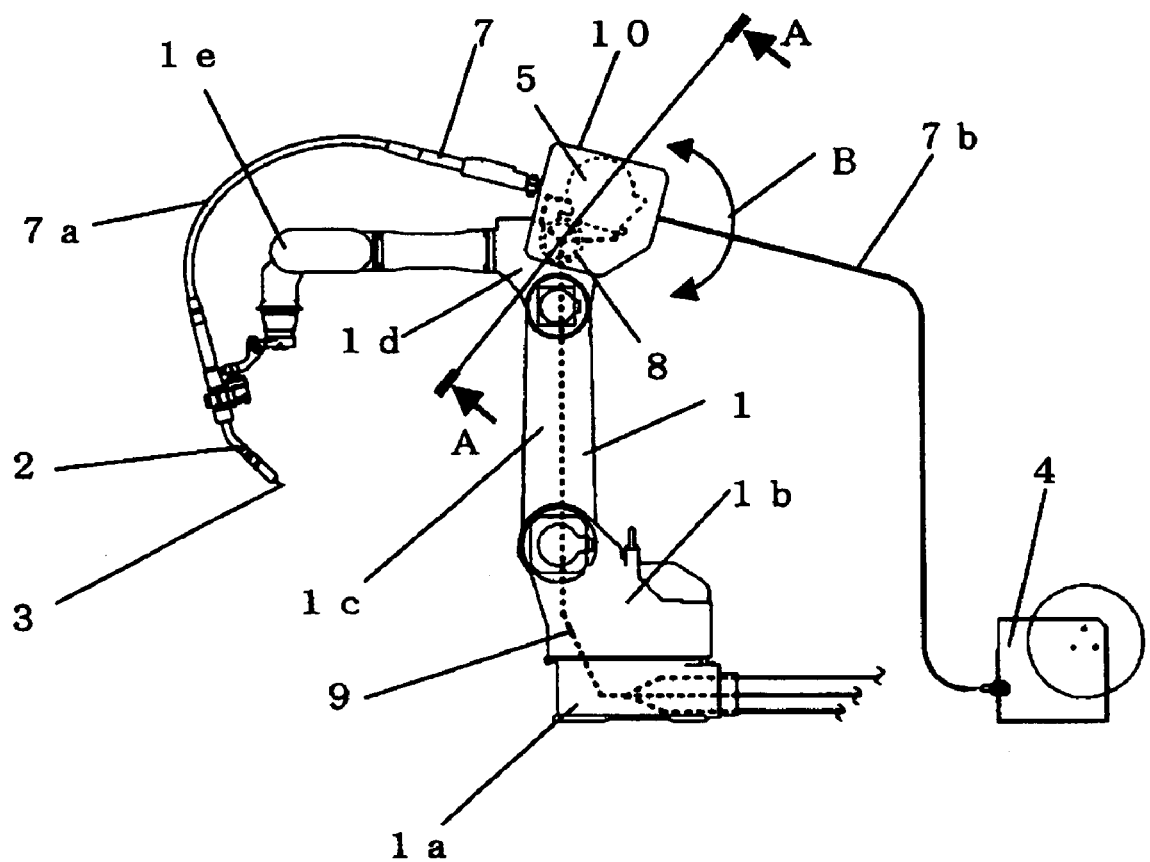
FIG. 1 is an external view of an embodiment 1 of an arc welding robot according to the invention.

1: Robot main body
1a: Base portion
1d: Forearm portion
3: Welding wire
5: Wire feed device
8: Rotary pipe shaft
8a: Hollow portion
9: Connecting cable and/or gas hose
10: Protection cover

BEST MODE FOR CARRYING OUT THE INVENTION

Now, description will be given below of the best mode for carrying out the invention with reference to FIGS. 1 to 4.

Embodiment 1

Figure 2:
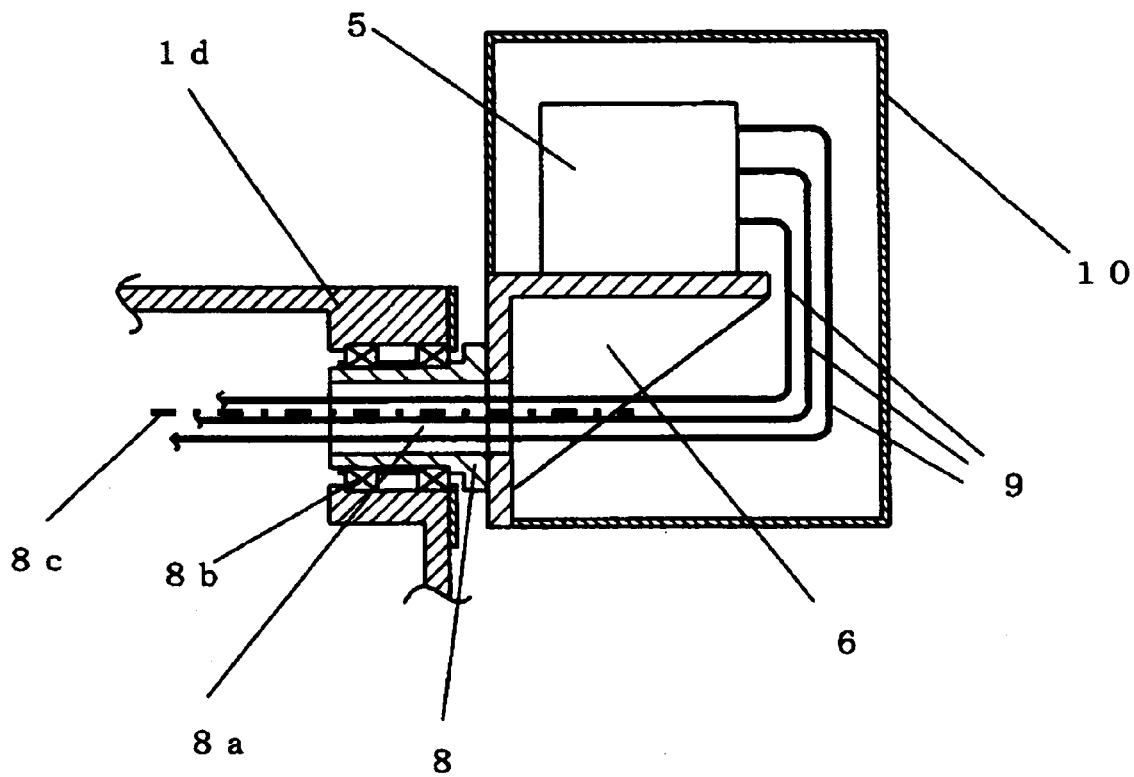
FIG. 2 is a partially enlarged section view of the embodiment 1, showing a state in which a wire feed device is mounted on a robot main body.

FIG. 1 is an external view of an arc welding robot according to an embodiment 1 of the invention. And, FIG. 2 is an enlarged section view of a wire feed device portion of the above arc welding robot. By the way, FIG. 2 is a section view taken along the line A-A shown in FIG. 1.

The invention is characterized by its wire feed device portion. Although the operations of the arc welding robot and the welding method thereof are similar to those of the conventional arc welding robot which have been described previously, they will be described here briefly.

In FIG. 1, a robot main body 1 according to the present embodiment includes a base portion 1a to be installed in a production line, a swing portion 1b mounted on the upper portion of the base portion 1a and swingable in the horizontal direction, an upper arm portion 1c mounted on the swing portion 1b and swingable back and forth, a forearm portion 1d mounted on the upper arm portion 1c and swingable in the vertical direction, and a wrist portion 1e mounted on the fore arm portion 1d and having three-degree freedom. The positioning of a welding torch 2 mounted on the wrist portion 1e is executed through the cooperative operations of the base portion 1a, swing portion 1b, upper arm portion 1c and forearm portion 1d, and the direction of the welding torch 2 is decided through the operation of the wrist portion 1e, thereby allowing the arc welding robot to perform an arc welding operation in a free attitude.

By the way, although the detailed description is omitted here, the arc welding robot according to the present embodiment can be actuated according to an operation pattern which can be decided by a previously set program or can be manually operated, while the arc welding robot cooperates together with a unit for controlling the welding robot and welding torch integrally in forming a system.

Also, reference character 5 designates a wire feed device which supplies a welding wire 3 to a welding torch 2 from a wire supply source 4 installed in a production line. And, 7 stands for a conduit cable which is composed of a conduit cable front portion 7a for connecting the wire feed device 5 to the welding torch 2 and a conduit cable rear portion 7b for connecting the wire feed device 5 to the wire supply source 4. The welding wire 3 is fed through the inside of the conduit cable 7 and is then sent out by the wire feed device 5 in the direction of the welding torch 2, that is, to the portion to be welded.

Next, description will be given below in detail of the wire feed device portion of the invention that is the characteristic portion of the invention with reference to FIGS. 1 and 2.

As shown in FIG. 1, the wire feed device 5 is covered with a protection cover 10 and is rotatably held on the forearm portion 1d of the robot main body 1 through a rotary pipe shaft 8. FIG. 2 shows the details of this portion and is a section view taken along the line A-A shown in FIG. 1. As shown in the section view of FIG. 2, in the rotary pipe shaft 8, there is formed a hollow portion 8a. The rotary pipe shaft 8 is formed integrally with a mounting member 6, is rotatably mounted on the forearm portion 1d through a bearing mechanism 8b, and can be rotated about its rotation center axis 8c. That is, the wire feed device 5 can be rotated freely with its surface extending substantially in the same direction as the wire feeding direction as the rotation surface thereof. By the way, an arrow mark B shown in FIG. 1 shows the rotation direction of the wire feed device 5.

And, on the wire feed device 5, there are mounted a connecting cable and/or a gas hose 9 which are respectively used to provide a welding power supply, issue a signal for opening and closing welding assist gas, provide a wire feed device power supply, and supply the welding assist gas; and, the connecting cable and/or hose 9 are guided from the hollow portion 8a into the inside of the forearm portion 1d, and are then guided from the base portion 1a to the outside, and are finally connected to a welding power supply (not shown), a gas supply source (not shown), an external control unit (not shown) and the like respectively. Also, 10 designates a protection cover which is mounted on the mounting member 6. The protection cover 10 has such a shape that can cover not only the wire feed device 5 but also the portions of the connecting cable and/or gas hose 9 ranging from the wire feed device 5 to the rotary pipe shaft 8.

Figure 3:
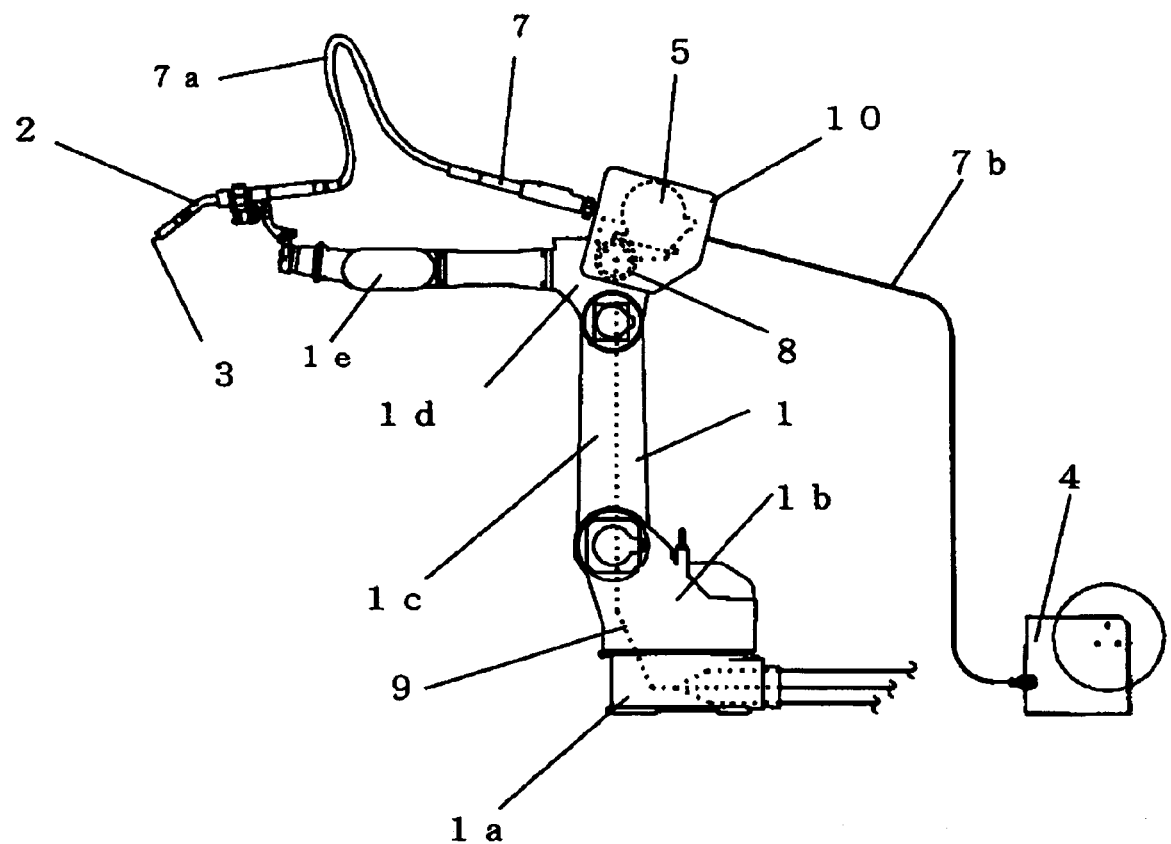
FIG. 3 is an external view of the embodiment 1, showing a first state of the robot in which a welding torch 2 is shifted backward.
Figure 4:
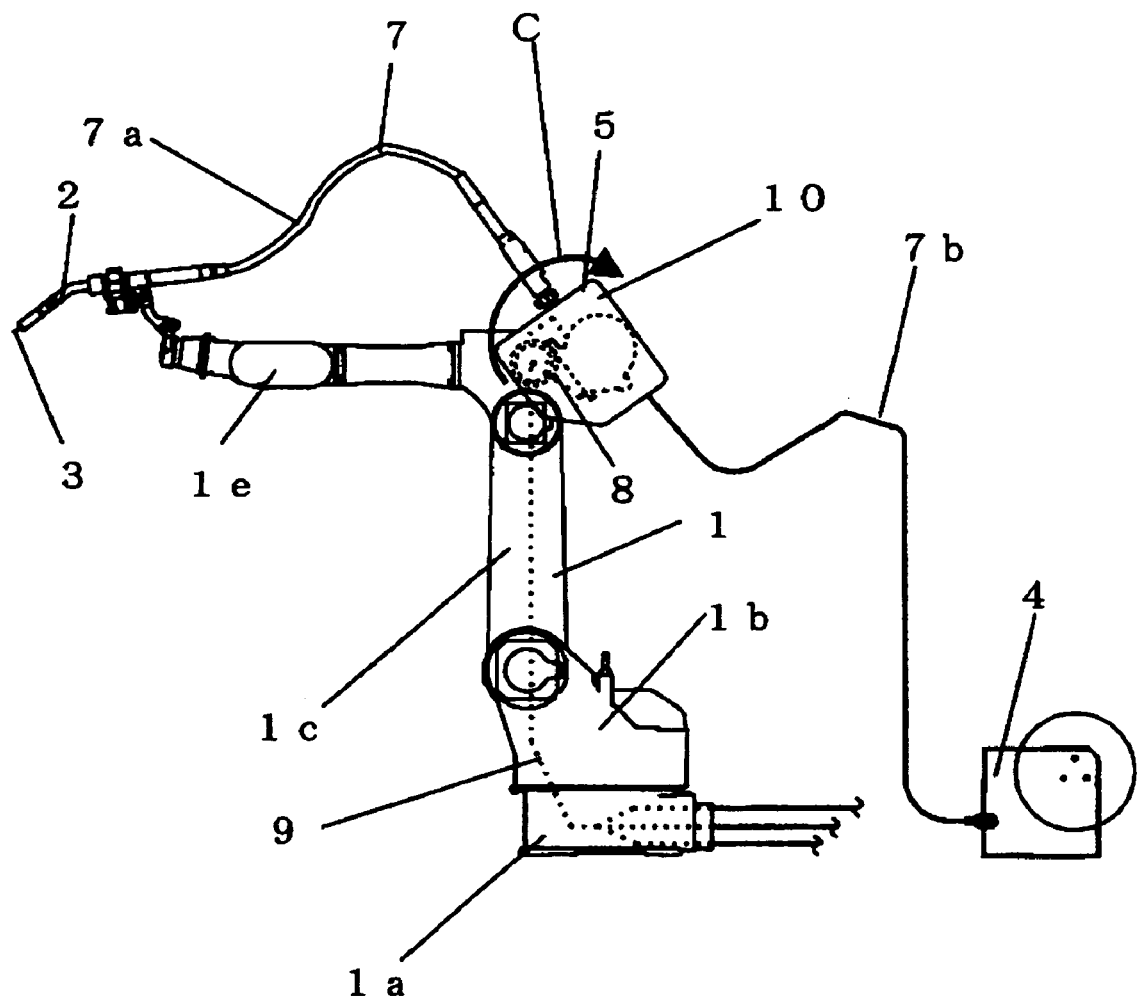
FIG. 4 is an external view of the embodiment 1, showing a second state of the robot in which the welding torch 2 is shifted backward.
Figure 5:
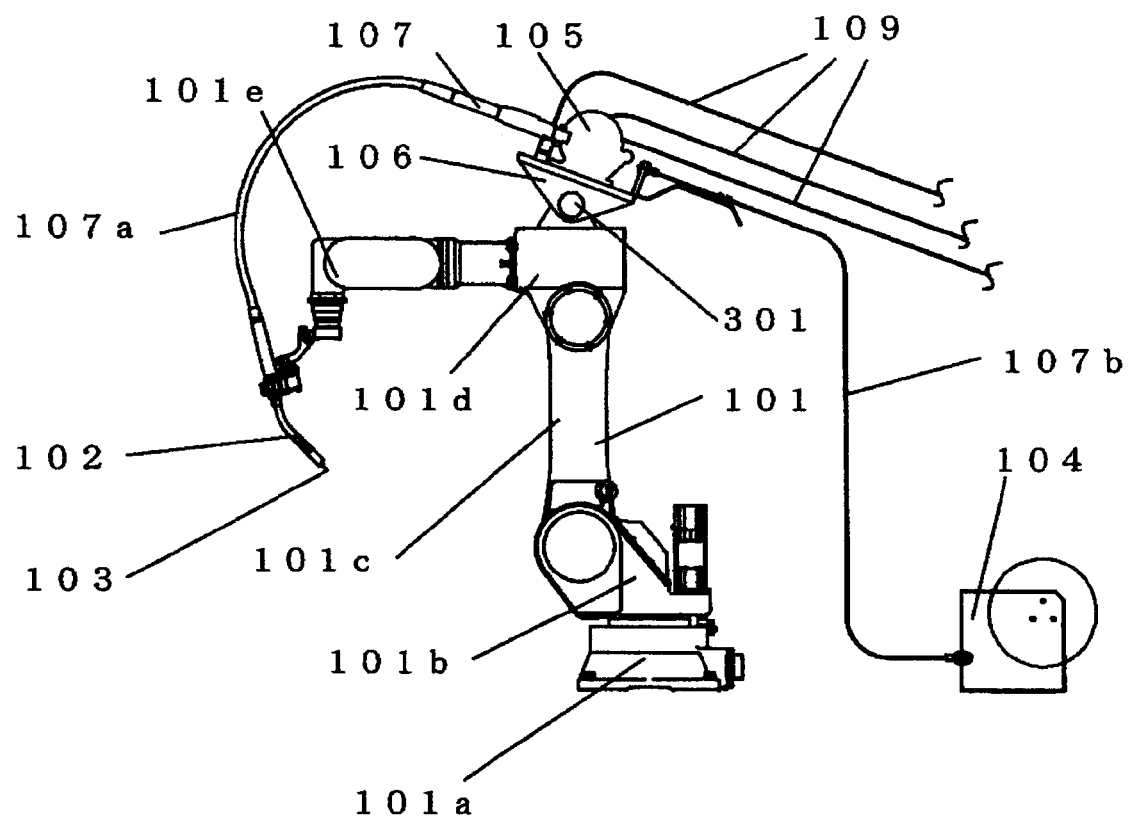
FIG. 5 is an external view of a conventional arc welding robot.

Next, description will be given below of the operation of the arc welding robot including the above-structured wire feed device 5. Firstly, when, because of variations in the attitudes of the respective portions of the robot main body 1, the welding torch 2 is shifted backward and approaches the wire feed device, such motion of the welding torch 2 gives the curved conduit cable front portion 7a a force to increase the curvature thereof, whereby, as shown in FIG. 3, the conduit cable front portion 7a is curved greatly. However, when this state occurs, as shown in FIG. 4, the conduit cable front portion 7a reacts against this and produces a restoring force (reacting force) to reduce the curvature thereof, whereby the wire feed device 5 is rotated backward in the arrow mark C direction and thus the conduit cable front portion 7a acts so as to keep its small curvature.

Next, the connecting cable and/or gas hose 9 are guided from the wire feed device 5, then guided through the respective interior portions of the protection cover 10, rotary pipe shaft 8 and robot main body 1, and are then connected to the welding power supply (not shown), gas supply source (not shown), external control unit (not shown) and the like in such a manner that they are fixed to the production line from the base portion 1a where no operation is executed. That is, the connecting cable and/or gas hose 9 can be prevented from swinging around.

As has been described above, according to the present embodiment, the curvature of the conduit cable 7 can be kept small to thereby realize the stable feed of the wire and, at the same time, the connecting cable and/or gas hose 9 are prevented from swinging around, which makes it possible to prevent them against interference with external equipment and thus against damage caused by such interference.

By the way, in the present embodiment, although the wire supply source 4 is installed in the production line, it may also be mounted on any one of the swing portion 1b, upper arm portion 1c, forearm portion 1d and mounting member 6. Also, although the protection cover 10 is formed to have such a shape that can cover both the wire feed device 5 and connecting cable and/or gas hose 9, it may also have such a shape as to cover only the connecting cable and/or gas hose 9.

Further, although both of the connecting cable and gas hose 9 are allowed to pass through the inside of the robot main body 1, even when one of them is allowed to pass therethrough, there can also be obtained a good effect.

Although description has been given heretofore in detail of the invention with reference to a specific embodiment thereof, it is obvious to those who are skilled in the art that further changes and modifications are possible without departing from the spirit and range of the invention.

The present application is based on the JP application (JP application 2004-186084) filed on 24th of June 2004 and the contents thereof are incorporated into the present application for reference.

INDUSTRIAL PRACTICABILITY

An arc welding robot according to the invention can feed a welding wire stably to thereby be able to execute high speed and high quality arc welding, can store connecting cable and/or gas hose in the inside of its robot main body to thereby be able not only to prevent them from interfering with external equipment but also to save an extra space for installation thereof, and can enhance the productivity of an arc welding production line and can save space. Therefore, the arc welding robot according to the invention is industrially useful.

The invention claimed is:

1. An arc welding robot actuatable according to an operation pattern based on a previously set program or manually operated for welding, comprising:
    a robot main body structured such that with the operation thereof is controlled, said robot main body including a base portion, a swing portion mounted on the base portion, an upper arm portion mounted on the swing portion, and a forearm portion mounted on the upper arm portion;
    a wire feed device for feeding a welding wire;
    a rotary pipe shaft configured to hold the wire feed device on the forearm portion such that the wire feed device is rotated on a rotation surface thereof extending substantially in a same direction as a feeding direction of the welding wire; and
    a connecting cable and/or a gas hose necessary to execute welding,
    wherein the connecting cable and/or the gas hose are in operative connection with the wire feed device, are guided from the wire feed device through a hollow portion of the rotary pipe shaft, and are then guided through an inside of the forearm portion, the upper arm portion, the swing portion, and the base portion of the robot main body.

2. An arc welding robot as set forth in claim 1, wherein the robot main body is a 6-shaft joint arm robot and the wire feed device is rotatably held on the forearm portion of the arm robot through the rotary pipe shaft.

3. An arc welding robot as set forth in claim 1, wherein the connecting cable and/or the gas hose include at least one of a cable for welding power supply, a cable for an opening and closing signal for welding assist gas, a cable for wire feed device power supply, and a gas hose for supply of the welding assist gas.

4. An arc welding robot as set forth in claim 1, further including a protection cover for covering the wire feed device.

5. An arc welding robot as set forth in claim 1, further including a protection cover for covering the portions of the connecting cable and/or the gas hose ranging from the wire feed device to the rotary pipe shaft.

* * * * *

UNITED STATES PATENT AND TRADEMARK OFFICE
CERTIFICATE OF CORRECTION

PATENT NO. : 7,378,613 B1  Page 1 of 1
APPLICATION NO. : 10/567977
DATED : May 27, 2008
INVENTOR(S) : Toshiyuki Mishima and Yasushi Mukai It is certified that error appears in the above-identified patent and that said Letters Patent is hereby corrected as shown below:

On the Title page, in section (75), second inventor, please delete "Yaushi", and insert therefor --Yasushi--.

Inventors should read:    Toshiyuki Mishima, Neyagawa (JP);
Yasushi Mukai, Osaka (JP);
Wataru Takahashi, Osaka (JP);
Takashi Nagai, Osaka (JP);
Takayasu Ohara, Osaka (JP)

Signed and Sealed this

Ninth Day of June, 2009

JOHN DOLL
*Acting Director of the United States Patent and Trademark Office*